Patented Mar. 6, 1928.

1,661,640

UNITED STATES PATENT OFFICE.

KENNETH VAN ALLEN, OF NEW YORK, N. Y.

POWDER ADAPTED TO LIBERATE IODINE.

No Drawing. Application filed April 24, 1926. Serial No. 104,473.

My invention relates to a pulverulent composition having antiseptic and therapeutic properties, and which is capable of liberating iodine upon coming in contact with water, or other aqueous substances or solutions. Generally, my invention consists in a dry, white, hygroscopic powder, capable of carrying, containing or acting as a vehicle for iodic acid and a reducing agent and which will liberate iodine in the presence of water, as stated.

Among the objects of my invention may be noted the following:

The production of a pulverulent substance containing a salt or compound in which iodine is present in the acid radical; the production of a soft, smooth, hygroscopic powder having therapeutic properties; and the production of a dry, white powder having characteristics such as noted in the foregoing and capable of liberating iodine when brought into contact with water or an aqueous substance.

In my composition I may use iodic acid; potassium iodide, or any salt or compound in which iodine is present in the acid radical; an alkaline reducing agent, or acid reducing agent; and a so-called filler, which will render the compound soft and smooth and dry.

In producing my composition, I mix together, according to any suitable process, potassium iodide, one gr.; iodic acid, 3 grs.; sodium sulphite, 4 grs.; and talc, 12 grs.

I may scent the mixture with a perfume that does not operate to disturb the combination of elements set forth in the claims and does not affect or liberate the iodine.

The foregoing ingredients are examples only of the constituents of my composition and may be varied, within certain limitations, both as to quantities and substances; but, in so doing, the fundamental characteristics of my composition, as set forth in the foregoing, must be observed.

The following is an equation representing substantially the reaction whereby iodine is set free:

$$2HIO_3 + 5Na_2SO_3 \rightarrow 5Na_2SO_4 + H_2O + I_2$$

or $$2NaIO_3 + 5NaHSO_3 \rightarrow 3NaHSO_4 + 2Na_2SO_4 + H_2O + I_2$$

Having thus described my invention, what I claim and desire to secure by Letters Patent is:

1. A pulverulent substance consisting of iodic acid, a reducing agent, and a filler.

2. A pulverulent substance consisting of iodic acid, an alkaline reducing agent, and a filler.

3. A pulverulent substance consisting of an oxygenated compound of iodine, a reducing agent, and a filler.

4. A pulverulent substance consisting of a salt in which iodine and oxygen in chemical combination is present in the acid radical, an acid reducing agent, and a filler.

5. A pulverulent substance consisting of iodic acid, alkali iodide, a reducing agent, and a filler.

6. A dry, white pulverulent compound consisting of potassium iodide, iodic acid, an acid reducing agent, and a filler.

7. A dry white pulverulent compound consisting of iodic acid, an alkali iodide, a reducing agent, and a filler.

8. A compound having therapeutic properties consisting of 1 gr. of potassium iodide, 3 grs. of iodic acid, 4 grs. of sodium sulphite, and 12 grs. of talc, the compound being approximately dry, white and soft.

Signed by me at New York city, N. Y., this 22nd day of April, 1926.

KENNETH VAN ALLEN.